United States Patent

[11] 3,589,639

| [72] | Inventors | Dieter Engelsmann<br>Unterhaching;<br>Rolf Schroder, Munich, both of, Germany |
|---|---|---|
| [21] | Appl. No. | 819,188 |
| [22] | Filed | Apr. 25, 1969 |
| [45] | Patented | June 29, 1971 |
| [73] | Assignee | Agfa-Gevaert Aktiengesellschaft<br>Leverkusen, Germany |
| [32] | Priority | May 3, 1968 |
| [33] | | Germany |
| [31] | | A 29 731/57 aGbm |

[54] FILM REWINDING MECHANISM FOR PHOTOGRAPHIC APPARATUS
12 Claims, 6 Drawing Figs.

| [52] | U.S. Cl. | 242/71.6 |
|---|---|---|
| [51] | Int. Cl. | G03b 1/04 |
| [50] | Field of Search | 242/71.3, 71, 71.1, 71.6 |

[56] References Cited
UNITED STATES PATENTS

| 2,245,214 | 6/1941 | Mihalyi | 242/71.3 |
| 2,902,231 | 9/1959 | Winkler et al. | 242/71.3 |
| 3,082,971 | 3/1963 | Miyauchi | 242/71.3 |

*Primary Examiner*—George F. Mautz
*Assistant Examiner*—Gregory A. Walters
*Attorney*—Michael S. Striker ABSTRACT: A still camera wherein a film rewinding knob is rotatable by the film transporting mechanism and is movable axially between an extended position in which it is disengaged from a cartridge in the chamber of the camera body and an operative position in which its claws engage complementary claws on the supply reel of a cartridge in the chamber. The camera body has a door which is movable between open and closed positions to respectively afford and prevent access to the chamber, and a locking device which can lock the door in closed position and automatically releases the rewinding knob for movement to extended position under the action of a helical spring when the door is unlocked. The connection between the locking bolt and the rewinding knob comprises a two-armed lever.

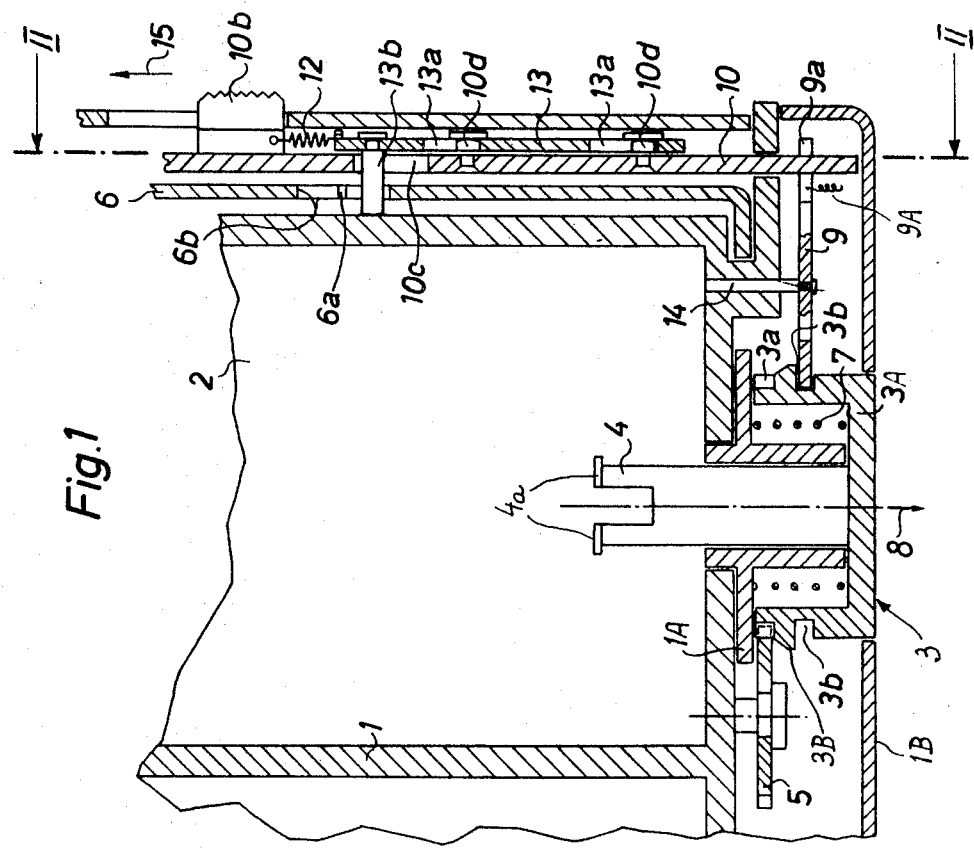
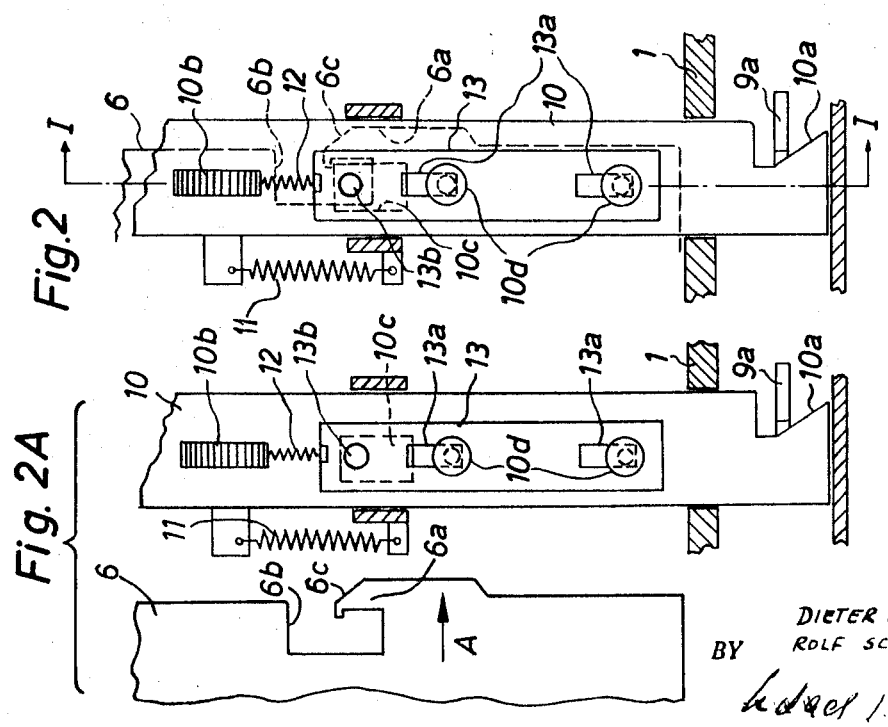

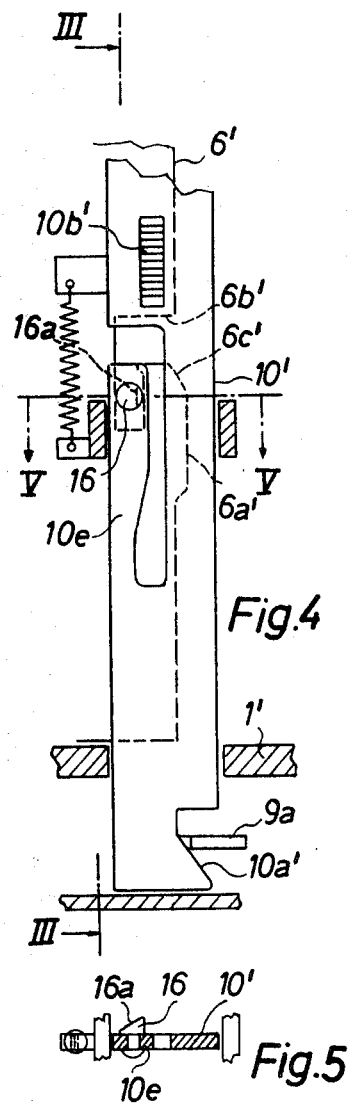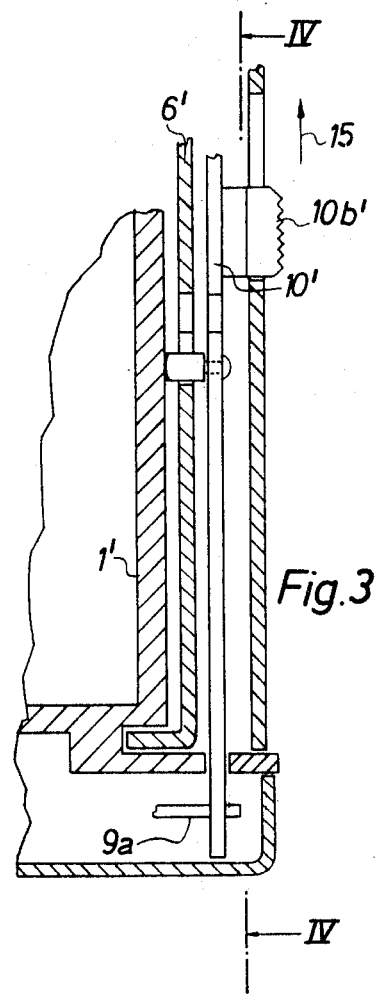

3,589,639

FILM REWINDING MECHANISM FOR PHOTOGRAPHIC APPARATUS

BACKGROUND OF THE INVENTION

The present invention relates to photographic apparatus in general, and more particularly to improvements in film rewinding mechanisms for use in still cameras or the like. Still more particularly, the invention relates to improvements in photographic apparatus of the type wherein a rotary rewinding member must be withdrawn from the chamber which accommodates the supply cartridge or magazine before the cartridge or magazine can be inserted into or withdrawn from such chamber.

SUMMARY OF THE INVENTION

An object of our invention is to provide a photographic apparatus wherein the rewinding member need not be manipulated by hand if the user wishes to gain access to a cartridge containing exposed or partly exposed film and/or when the user wishes to gain access to the chamber for insertion of a fresh magazine or cartridge.

Another object of the invention is to provide a photographic apparatus wherein the film rewinding member is automatically disengaged from the supply reel in a film magazine or cartridge when the user performs such manipulations which are necessary to gain access to the cartridge or magazine.

A further object of the invention is to provide a photographic apparatus wherein the film rewinding member can be coupled to the supply reel of a properly inserted magazine or cartridge before the rear wall or another movable part of the camera body is returned to closed position in order to seal the cartridge-receiving chamber from light.

The improved photographic apparatus comprises a housing or body defining a chamber adapted to accommodate a film container (such as a film cassette, magazine or cartridge) and including a door movable between open and closed positions to respectively afford and prevent access to the chamber, locking means preferably including one or more locking bolts mounted on the housing and movable between first and second positions to thereby respectively lock and unlock the door in closed position of the door, a rotary film rewinding member (which is preferably a knob having an annulus of gear teeth and a shaft capable of engaging and transmitting torque to or receiving torque from the core of a supply reel for roll film) mounted in the housing and movable axially between operative (depressed) and extended positions in which its shaft respectively projects into and is withdrawn from the chamber, and retaining means preferably comprising a pivotably mounted two-armed coupling lever which cooperates with the locking means to hold the rewinding member in operative position in the first position of the locking means and to release the rewinding member for movement toward extended position in response to movement of the locking means to second position so that a helical spring or analogous biasing means can automatically propel the rewinding member to extended position in response to unlocking of the door. This insures that the shaft of the rewinding member cannot interfere with insertion or withdrawal of film containers from the chamber.

The novel features which are considered as characteristic of the invention are set forth in particular in the appended claims. The improved rewinding mechanism itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an enlarged fragmentary vertical sectional view of a still camera which embodies one form of our invention, the door of the camera body being shown in closed position and the rewinding knob being shown in operative position, the section being taken in the direction of arrows as seen from the line I-I of FIG. 2;

FIG. 2 is a sectional view as seen in the direction of arrows from the line II-II of FIG. 1;

FIG. 2-A is a view similar to FIG. 2 but with the door in the open position;

FIG. 3 is a fragmentary sectional view of a modified still camera, substantially as seen in the direction of arrows from the line III-III of FIG. 4;

FIG. 4 is a sectional view as seen in the direction of arrows from the line IV-IV of FIG. 3; and FIG. 5 is a sectional view as seen in the direction of arrows from the line V-V of FIG. 4.

DESCRIPTION OF THE PREFERRED EMBODIMENTS

FIGS. 1 and 2 illustrate a portion of a photographic apparatus which comprises a body or housing 1 defining a chamber 2 for a film container such as a supply cartridge or magazine, not shown. One end wall of the body 1 supports a rotary and axially movable rewinding or rewind knob 3 which is provided with a stem or shaft 4 having coupling claws 4a adapted to engage complementary coupling claws of the supply reel in a film container in a manner well known from the art of still cameras. When the container is introduced into the chamber 2, the shaft 4 must be withdrawn in the direction indicated by arrow 8, and the rewinding knob 3 is thereupon pushed upwardly, as viewed in FIG. 1, to move the claws 4a into engagement with the claws on the reel of a properly inserted container. Thus, the shaft 4 must be withdrawn or expelled from the chamber 2 prior to insertion of a fresh film container and also preparatory to withdrawal of a container with exposed film therein. The arrangement is preferably such that the knob 3 is coupled to the film transporting mechanism and rotates when the film is being withdrawn from a container in the chamber 2 to thereby indicate that the film is being transported in the prescribed way. The film transporting mechanism comprises a rapid advance lever or wheel (not shown) which is coupled to the takeup reel during normal operation to advance the film by the length of a frame subsequent to completion of an exposure. When the last frame of film which is being withdrawn from the container in the chamber is exposed, the user of the camera operates a switchover device (not shown) which connects the rapid transport lever with a gear 5 shown in the lower part of FIG. 1 and forming part of the film transporting mechanism whereby the lever can rotate the knob 3 by way of the gear 5 and in such direction that the exposed film is returned into the container in the chamber 2. The knob 3 is provided with a set of gear teeth 3a which mesh with the teeth of the gear 5 when the knob assumes the operative or depressed position shown in FIG. 1. The knob 3 need not be pulled in the direction indicated by arrow 8 and it need not be rotated by hand in order to return exposed film into the container which is accommodated in the chamber 2. The only time when the knob 3 must be moved to its extended or exposed position is when a container is to be inserted into or withdrawn from the chamber 2. In order to eliminate unnecessary manipulation of the knob 3, particularly to avoid manual withdrawal of the knob 3 to extended position in which the shaft 4 is located without the chamber 2, the camera of FIGS. 1 and 2 is provided with a helical spring 7 which serves as a biasing means and automatically moves the knob 3 to extended position when the user opens the rear wall or another movable portion of the body 1 so as to gain access to the chamber 2. The movable wall is shown at 6; this wall constitutes a door which is preferably pivotably secured to the remaining major part of the body 1 by one or more hinges, not shown. The construction of the camera is such that the spring 7 is free to move the knob 3 to extended position when the door 6 is moved to open position or is free to move from closed to open position, and that the knob 3 can be depressed by hand prior or subsequent to closing of the door 6 whereby the thus depressed knob thereupon remains in the position shown in FIG. 1. In such position, the spring 7 is stressed between a flange 1A, which can be said to form part of the body 1, and an end panel 3A of the knob 3. The retaining means for normally (but releasably) holding the knob 3 in the illustrated depressed or operative position comprises a two-armed coupling lever 9 which is turnable on a pivot pin 14 mounted in the body 1 and extending in parallelism with the shaft 4. The skirt of the knob 3 is formed with a circumferential groove 3b which is located between the teeth 3a and the panel 3A and which normally receives one arm 9b of the coupling or retaining lever 9. The other arm 9a of the lever 9 is then engaged and held by an inclined cam face 10a of a reciprocable first locking bolt which forms part of a composite locking device for the door 6. The locking bolt 10 has a handgrip portion 10b which is accessible from the exterior of the body 1 and can be moved by hand from the illustrated first position to a second position by moving in the direction indicated by arrow 15. A return spring 11 biases the locking bolt 10 downwardly to first position and this bolt is provided with a cutout or aperture 10c and two guide pins 10d. A helical spring 12 couples the locking bolt 10 with a reciprocable second locking bolt or slide 13 which is formed with elongated slots 13a for the guide pins 10a. A locking pin 13b is rigid with the slide 13 and extends through the aperture 10c and engages an elastic tongue 6a of the door 6 to thereby hold the door in closed and locked position. The door has an L-shaped slot 6b the vertical portion of which is flanked at one side by the elastic tongue 6a.

In order to unlock the door 6, the user of the camera moves the handgrip portion 10b in the direction indicated by arrow 15. The locking bolt 10 entrains the slide 13 through the intermediary of guide pins 10d so that the locking pin 13 moves upwardly past the elastic tongue 6a and into the upper part of the slot 6b of the door. A spring or the like (not shown) then moves the door 6 toward or all the way to open position whereby the pin 13 does not interfere with such movement of the door because it is located in the upper part of the slot 6b. While the locking bolt 10 moves upwardly (arrow 15), its cam face 10a turns the lever 9 by way of the arm 9a whereby the lever moves its arm 9b away from the groove 3b of the knob 3. This enables the spring 7 to expand and to propel the knob 3 downwardly and to hold it in extended position in which an annular shoulder 3B of the knob abuts against the bottom portion 1B of the body 1. The claws 4a of the shaft 4 are thereby disengaged from the claws of the reel in the container which is accommodated in the chamber 2 so that the container can be withdrawn as soon as the door 6 assumes its open position to afford access to the chamber. The operator can withdraw a container with exposed film and the chamber 2 is then ready to accommodate a container with unexposed film. If the chamber 2 is empty at the time when the user moves the handgrip portion 10b in the direction indicated by arrow 15, the shaft 4 is simply withdrawn so that the user can insert a fresh container.

The spring 11 contracts as soon as the user releases the handgrip portion 10b so that the locking bolt 10 moves downwardly and back to the first position shown in FIG. 1. However, the lever 9 cannot immediately reassume its retaining position because the knob 3 is held in extended position by the helical spring 7. The user inserts a fresh container into the chamber 2 and thereupon depresses the knob 3 by hand so that the knob returns to the operative position shown in FIG. 1 whereby the claws 4a of its shaft 4 engage the claws on the core of the reel which supports convoluted unexposed roll film in the freshly inserted container. The teeth 3a of the knob 3 then return into mesh with teeth of the gear 5. A spring 9A thereupon propels the arm 9b of the lever 9 into the groove 3b so that the knob 3 is held in the illustrated position. At least a portion of the lever 9 may consist of elastically deformable material to permit return movement of the knob 3 to operative position. In the final step, the user pushes the door 6 back toward closed position without any manipulation of the handgrip portion 10b. During movement of the door 6 toward closed position, the locking pin 13b of the slide 13 engages the inclined cam face 6c of the elastic tongue 6a whereby the slide 13 is displaced with reference to the locking bolt 10 in the direction indicated by arrow 15. Once the cam face 6c advances beyond the pin 13b, the latter is free to enter the vertical leg of the slot 6b under the action of the spring 12 whereby the door 6 is held in closed and locked position. Thus, closing of the door 6 does not effect movement of the knob 3 to extended position because the locking bolt 10 is not displaced while the user returns the door 6 to the position shown in FIG. 1 and 2 so that the lever 9 is at a standstill. This is due to the fact that the locking pin 13b is provided on the slide 13 and that the slide is reciprocable with reference to the locking bolt 10. When the user has completed the exposure of all film frames, i.e., when the major part of film is withdrawn from the container in the chamber 2, the user manipulates the aforementioned switchover device and thereupon actuates the rapid transport lever to rotate the gear 5 in a direction which causes the knob 3 to rotate with its shaft 4 and to return exposed film into the container. The handgrip portion 10b is thereupon moved in the direction indicated by arrow 15 so that the lever 9 releases the knob 3 and the spring 7 expands to withdraw the shaft 4 from the chamber 2. The user is then free to remove the container (with the exposed film therein) from the chamber 2 and to replace such container with a fresh container. The knob 3 is then depressed by hand and is immediately held by the arm 9b of the lever 9. In the final step, the operator again returns the door 6 to closed position whereby the locking pin 13b engages the elastic tongue 6a in the aforedescribed manner while the knob 3 remains in depressed or operative position. Thus, return movement of the door 6 to closed position can take place without any displacement of the lever 9 and locking bolt 10. The spring 11 is stronger than the spring 12.

FIGS. 3 to 5 illustrate a portion of a modified camera. The knob 3 (not shown) and the lever 9 are mounted and operated in the same way as described in connection with FIGS. 1 and 2. The housing or body 1' has a movable wall or door 6' and carries a modified locking device including a single locking bolt 10' having a cam face 10a' and a handgrip portion 10b' which must be moved in the direction indicated by arrow 15 in order to overcome the bias of the spring 11' and to thereby permit movement of door 6' to open position. The slide 13 of FIGS. 1 and 2 is omitted and a locking pin 16 is mounted directly on the bolt 10', namely, on an elastic tongue 10e of the bolt. The locking pin 16 has an inclined cam face 16a. When the user wishes to release the door 6' and the knob 3, the locking bolt 10' is moved by way of its handgrip portion 10b' (arrow 15) so that the arm 9a of the lever 9 is pivoted and causes the arm 9b to leave the groove 3b of the knob. During closing of the door 6', the cam face 6c' of the tongue 6a' cooperates with the inclined cam face 16a to lift the tongue 10e so that the locking pin 16 moves at right angles to the locking direction and moves behind the tongue 6a' of the door 6' to hold the latter in closed and locked position. The character 6b' denotes the L-shaped slot of the door 6'.

It will be noted that the improved photographic apparatus exhibits the following important and advantageous features: The film rewinding knob 3 is automatically disengaged from the reel of a film container when the door 6 or 6' of the camera body is unlocked so that the container can be withdrawn from its chamber as soon as it becomes accessible. Alternatively, and if the user decides to open the door while the chamber for the film container is empty, such opening of the door automatically effects movement of the film rewinding knob to inoperative position so that the knob cannot interfere with insertion of a fresh container. Furthermore, the knob remains in its position during closing of the door, i.e., the knob can assume its operative or inoperative position while the user moves the door to closed and locked position. This enables the user to move the knob into engagement with the reel of a freshly inserted container prior or subsequent to closing and locking of the door. The position of the part (lever 9) which serves to retain the knob 3 in operative position does not change when the door 6 or 6' is being moved to its closed and locked position.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What I claim as new and desire to be protected by Letters Patent is set forth in the appended claims.

1. In a photographic apparatus, a combination comprising a housing defining a chamber adapted to accommodate a film container and including a door movable between open and closed positions to respectively afford and prevent access to said chamber; locking means mounted on said housing and movable between first and second positions to thereby respectively lock and unlock said door in closed position thereof; a rotary film rewinding member mounted in said housing and movable axially between operative and extended positions in which a portion thereof respectively projects into and is withdrawn from said chamber; and retaining means cooperating with said locking means to hold said rewinding member in operative position in the first position of said locking means and to release said rewinding member for movement to extended position in response to movement said locking means to second position.

2. A combination as defined in claim 1, further comprising film transporting means having a portion engaging with and adapted to rotate said rewinding member in the operative position of said rewinding member.

3. A combination as defined in claim 1, further comprising biasing means for permanently urging said rewinding member to extended position so that the rewinding member automatically assumes such extended position in response to movement of said locking means to second position.

4. A combination as defined in claim 3, wherein said retaining means comprises a lever pivotably mounted in said housing and having a first arm engaging said locking means and a second arm engaging and holding said rewinding member in the operative position of said rewinding member.

5. A combination as defined in claim 4, wherein said locking means comprises a cam face arranged to pivot the first arm of said lever in response to movement of said locking means from first to second position and to thereby disengage said second arm from said rewinding member.

6. A combination as defined in claim 5, wherein said locking means comprises a reciprocable locking bolt which is provided with said cam face and wherein said rewinding member is provided with a circumferential groove into which said second arm extends in the operative position of said rewinding member and in the first position of said locking means.

7. A combination as defined in claim 1, wherein said retaining means is at a standstill during movement of said door from open to closed position.

8. A combination as defined in claim 7, wherein said locking means comprises a manually operated first locking bolt which is reciprocable between said first and second positions and a second locking bolt coupled to and movable relative to said first locking bolt, said first locking bolt cooperating with said retaining means and said second locking bolt having a portion engaging and holding said door in closed position in the first position of said first locking bolt and being disengaged from said door in response to movement of said first locking bolt to second position.

9. A combination as defined in claim 8, wherein said locking means further comprises resilient means coupling said second locking bolt to said first locking bolt and arranged to yield in response to movement of said door to closed position in the first position of said first locking bolt so that said portion of said second locking bolt can engage and lock the door when the latter completes its movement to closed position while said first locking bolt dwells in said first position thereof.

10. A combination as defined in claim 9, wherein said door has a cam face which engages said portion of said second bolt and thereby moves said second bolt with reference to said first bolt to stress said resilient means during a predetermined stage of movement of said door toward closed position.

11. A combination as defied in claim 7, wherein said locking means comprises a locking bolt which is reciprocable between said first and second positions and wherein said bolt comprises a resilient locking portion cooperating with a portion of said door during a predetermined stage of movement of said door toward closed position whereby said resilient portion first yields and thereupon locks the door in closed position while said bolt dwells in first position.

12. A combination as defined in claim 11, wherein said resilient locking portion comprises a springy tongue and a locking pin provided on said tongue.